United States Patent [19]

Burstyn

[11] Patent Number: 4,929,080
[45] Date of Patent: May 29, 1990

[54] APPARATUS FOR THE OPTICAL MEASUREMENT OF SPECTRA DISTRIBUTION

[75] Inventor: Herschel Burstyn, Plainsboro, N.J.

[73] Assignee: Litton Systems, Inc., Beverly Hills, Calif.

[21] Appl. No.: 194,391

[22] Filed: May 16, 1988

[51] Int. Cl.$^5$ ............................................. G01B 9/02
[52] U.S. Cl. ................................. 356/338; 356/351
[58] Field of Search ............................. 356/338, 351

[56] References Cited

U.S. PATENT DOCUMENTS

| 4,027,973 | 6/1977 | Kaye | 356/338 |
|---|---|---|---|
| 4,636,075 | 1/1987 | Knollenberg | 356/338 |
| 4,671,657 | 6/1987 | Calvani et al. | 356/351 |
| 4,798,468 | 1/1989 | Ohuchi | 356/351 |

OTHER PUBLICATIONS

Glance, Bernard S., "An Optical Heterodyne Mixer Providing Image-Frequency Rejection," *Journal of Lightwave Technology*, Nov. 1986.
Walker, N. G., et al. "Simultaneous Phase and Amplitude Measurements on Optical Signals Using a Multiport Junction," *Electronics Letters*, Oct. 4, 1984.
Travis, A. R. L., Carroll, J. E., "Possible Fused Fibre In-Phase/Quadrature Measuring Multiport," *Electronics Letters*, Oct. 10, 1985.
Asada, O, et al. "Homodyne Method for Detecting Asymmetric Spectra", *Rev. Sci. Instrum.* 51(10) Oct. 1980.
Machida, Susumu, et al. "Quantum-Limited Operation of Balanced Mixer Homodyne and Heterodyne Receivers," *IEEE Journal of Quantum Electronics*, May 1986.
Goldman, Stan, "Understanding the Limits of Quadrature Detection," *Microwaves & RF*, Dec. 1986.
Jackson, D. A. et al., "Fibre Gyroscope with Passive Quadrature Detection", *Electronics Letters*, May 10, 1984.

Primary Examiner—Davis L. Willis
Assistant Examiner—S. A. Turner

[57] ABSTRACT

An optical double-balanced quadrature mixer for analysis of optical spectra, particularly asymmetric optical spectra. Beam splitting means are used in conjunction with a quarter wavelength retardation plate to enable highly stable, accurate and precise spectral analysis. The invention is illustrated in the context of a generic light scattering test setup.

10 Claims, 2 Drawing Sheets

APPARATUS FOR THE OPTICAL MEASUREMENT OF SPECTRA DISTRIBUTION

FIELD OF THE INVENTION

This invention relates to apparatus for measuring optical spectra distribution and, more specifically, for measuring optical spectra distribution which is not symmetric about a center frequency.

BACKGROUND OF THE INVENTION

Accurate and precise measurement of optical spectra is important to numerous fields. This includes measurements of the dynamical properties of hydrodynamic systems by light scattering, examination of the convoluted spectra characteristics of thin fluid films under shear or subject to temperature gradients, laser doppler anemometry, and fiber optic communications. More generally, such measurements are useful in systems which modulate or demodulate the phase, amplitude or frequency of an optical signal, or which phase lock two or more optical oscillators.

Quite often, the spectral distribution of the optical signal is not symmetric about a center frequency. Available systems, however, seem not to be well suited for measuring such asymmetric spectra.

One such system has been described by Bernard S. Glance in his article "An Optical Heterodyne Mixer Providing Image-Frequency Rejection," published in the Journal of Lightwave Technology, Volume LT-4, No. 11, November of 1986 at pp. 1722-1725. Glance proposes to use a beam splitter to add the signal to a local oscillator signal. The merged beam enters a polarizing beam splitter which separates the two orthogonal polarization components of the beam. Each of the two exiting beams is then detected separately by a photodiode, and the two resulting currents are added.

The Glance system, unfortunately, requires a very strong local oscillator in order to work well, typically 10 to 100 times the magnitude of the test signal. This seriously limits the available dynamic range and injects substantial noise.

Another system is disclosed by N. Walker and J. Carroll in their article "Simultaneous Phase and Amplitude Measurements on Optical Signals Using A Multiport Junction," published in Electronics Letters on Nov. 8, 1984, Volume 20, No. 23 at pp. 981-83. Four beam splitters are arranged to form an eight-port junction. The measurement of the power output from the eight ports can then be used to calculate the phase and amplitude of the signal relative to the reference.

In this system, however, the spacing between the beam splitter cubes is critical. Since these cubes are traditionally affixed to a common substrate which expands and contracts with changes in temperature, the system has a significant degree of temperature instability and associated drift.

SUMMARY OF THE INVENTION

One object of the present invention is to obviate these and other problems in the prior art.

Another object of the present invention is to provide apparatus which can accurately and precisely measure optical spectra, including asymmetric optical spectra.

A further object of the present invention is to provide an optical mixer which has good temperature stability, a large dynamic range, and a high image rejection ratio.

A still further object of the present invention is to provide an optical, polarization-dependent, double-balanced quadrature mixer which uses a plurality of beam splitting means whose spacing with respect to one another is not critical.

These and other objects of the present invention are achieved through the use of a plurality of beam splitting means arranged to function as a doublebalanced quadrature mixer. Means to retard one of the split beams is included in order to achieve a 90 degree phase shift.

BRIEF DESCRIPTION OF THE DRAWINGS

These and other objects, features and advantages of the present invention will become apparent from consideration of the following detailed description, when read in conjunction with the accompanying drawings, wherein:

FIG. 3 illustrates the typical vector relationship between the test signal, the reference signal and the orientation of the first beam splitting cube.

DETAILED DESCRIPTION

Figure 1:
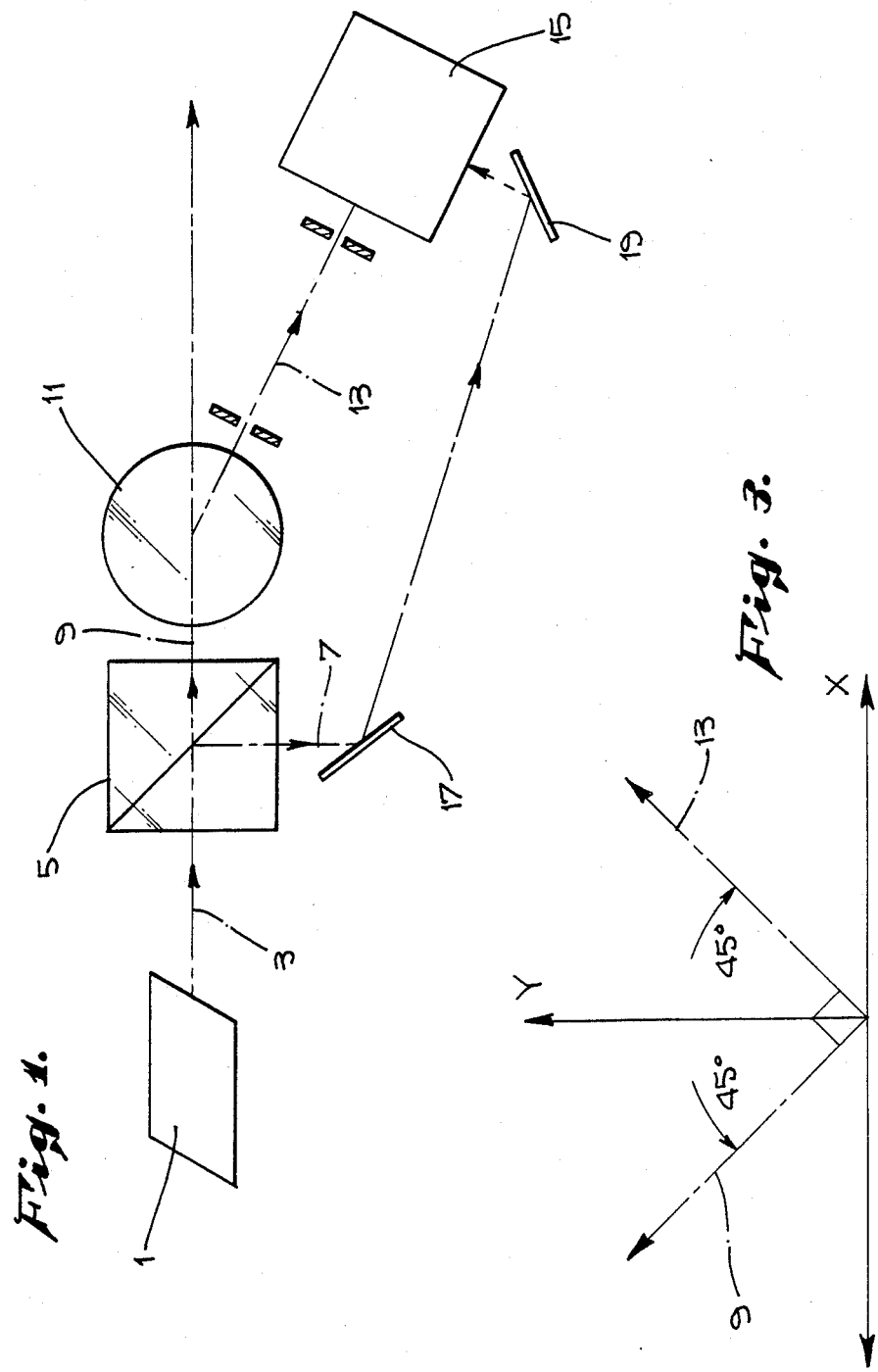
FIG. 1 is a block diagram of a typical setup for making light scattering measurements.

FIG. 1 is a block diagram of a typical setup for making light scattering measurements. It illustrates one of the many applications in which the subject invention is well suited.

As shown in FIG. 1, a laser 1 produces a monochromatic beam of light 3 which is directed into a beam splitter cube 5. This causes the incoming beam 3 to be split into a reference beam 7 and a test beam 9.

The test beam 9, in turn, is directed into a sample 11 which is the material to be tested. Emanating from the sample is a scattered beam 13 which will be modulated based on the dynamic influences which are placed on the sample 11.

In order to analyze the modulations on the scattered beam 13, the scattered beam 13 and the reference beam 7 are directed into a detector 15. For this purpose, mirrors 17 and 19 are used to redirect the path of the reference beam 7 into the detector 15. Using the reference beam 7 as a local oscillator, the detector 15 is able to extract the modulation from the scattered beam 13.

Several types of test samples will generate asymmetric spectra in the scattered beam 13. Fluids in non-equilibrium steady-state condition, for example, typically generate asymmetric Brillouin lines, while fluids maintained in a temperature gradient or under Poiseuille flow typically generate asymmetric Rayleigh lines. Thin fluid films confined between two solid layers are another example of a system which generates an asymmetric scattered beam.

One type of detector which can advantageously be used as the detector 15 for accurately and precisely measuring the asymmetric spectral distribution in the scattered beam 13 is the present invention. The elements of the preferred embodiment of the present invention are shown in FIG. 2.

Figure 2:
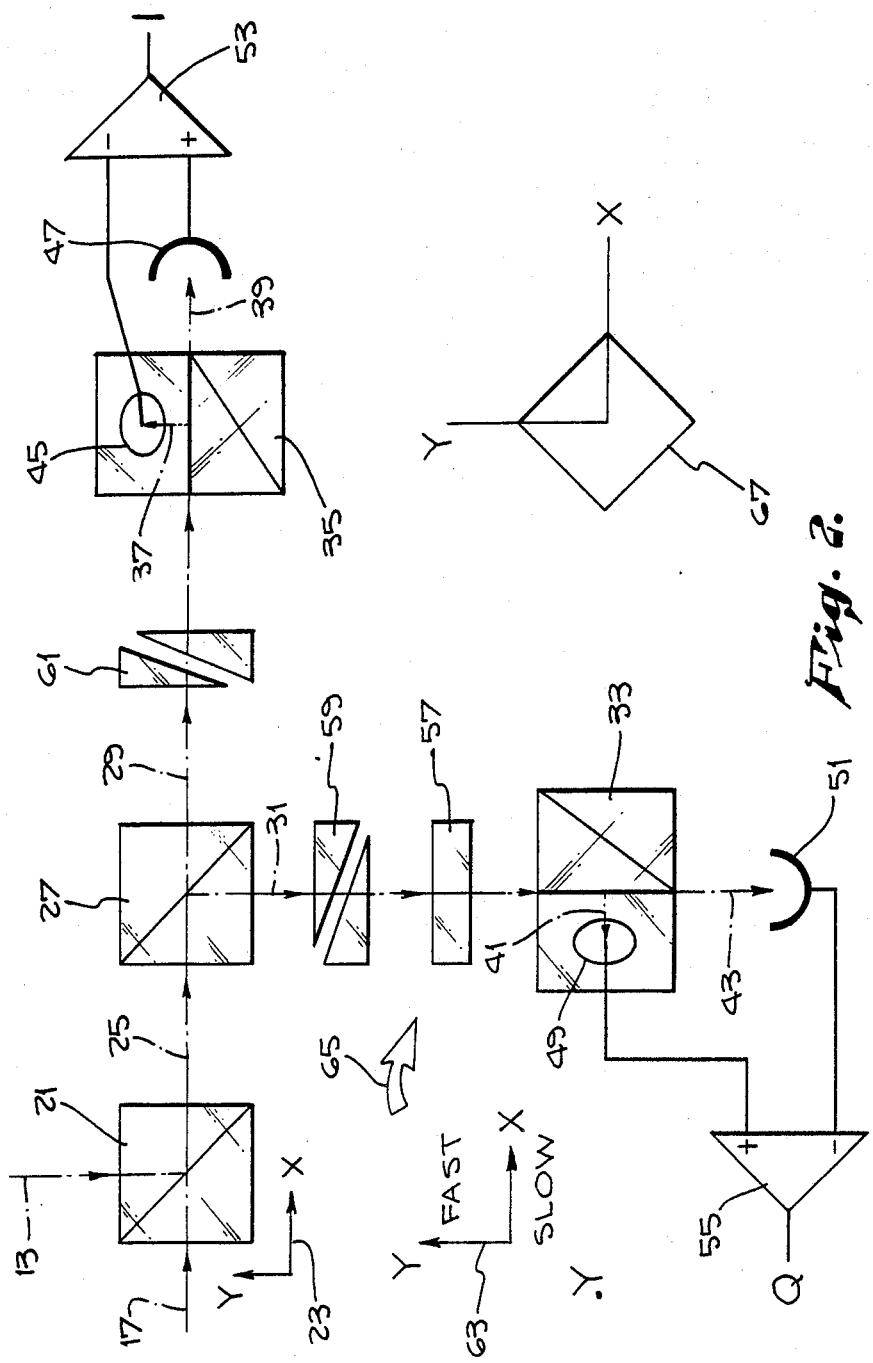
FIG. 2 is a block diagram of the preferred embodiment of the present invention.

As shown in FIG. 2, the scattered beam 13 enters one face of a beam splitting cube 21. The reference beam 7 enters another face of the beam splitting cube, which is orthogonal to the face into which the beam 13 is directed.

The Y axis is understood to be perpendicular to the plane in which FIG. 2 is drawn and the X direction is understood to be perpendicular to both the Y, axis and the Poynting vector. The reference beam 7 and the scattered beam 13 should be linearly polarized and perpendicular with respect to each other. This vector relationship is illustrated in FIG. 3.

The beam splitting cube 21 combines the reference beam 7 and the scattered beam 13. Emerging is a combined beam 25 which is directed into a beam splitting cube 27 which causes the combined beam 25 to be split into beams 29 and 31. Each of the beams 29 and 31, in turn, is directed into polarizing cubes 33 and 35, respectively. Each of the polarizing cubes 33 and 35, in turn, split the beams 29 and 31, respectively, into component beams 37, 39, 41 and 43, each of which is directed to photodetectors 45, 47, 49, and 51, respectively. Other beam intensity measuring means could also be used.

The output of the photodetector 45 is subtracted from the output of the photodetector 47 by a subtracter 53. Similarly, the output of the photodetector 51 is subtracted from the output of the photodetector 49 by a subtracter 55.

Interposed in the path of the beam 31 is a retardation plate 57. Interposed in the path of beams 31 and 29, respectively, are compensator pairs 59 and compensator pairs 61.

All of the beam splitter cubes can be made of materials well known in the art, including glass or quartz. They typically have a dielectric or thin metal film reflecting surface. Other types of beam splitting means, such as a prism, may be used instead.

The beam splitting cube 21 can be a polarization cube or can be polarization independent. The beam splitting cube 27, on the other hand, must be polarization independent. If desired, the beam splitting cube 21 can be eliminated by directly injecting the reference beam 7 and the scattered beam 13 into the orthogonal faces of the beam splitting cube 27. However, applicant believes that calibration will be very difficult.

The retardation plate 57 is preferably a zero order quarter wavelength plate. It should be oriented so that its "slow" and "fast" axes coincide with the directions of the reference beam 7 and the scattered beam 13, respectively. This is graphically illustrated by an X-Y axes 63 and an inset 65. The retardation plate 57 shifts the relative phase between the orthonormal polarization components in beam 31 substantially 90 degrees.

In order to compensate for imperfections in the retardation plate over the desired bandwidth, the compensators 59 and 61 are used. Preferably, these are Soleil-Babinet compensators.

To determine bandwidth power, the square root is taken of the sum of the square of the outputs of the subtracters 53 and 55, respectively (i.e. $\sqrt{I^2+Q^2}$). To determine phase of the scattered beam 13 relative to the test beam 7, the arc-tangent of the ratio of the output of the subtracter 53 to the output of the subtracter 55 is taken (i.e. $\text{Tan}^{-1}(I/Q)$).

If operating in the frequency domain, the subtracters 53 and 55 will simply be linear amplifiers. On the other hand, if counting photons, the subtracters 53 and 55 would be devices which subtract photon counts taken over a short predetermined period. Time domain analysis can include I and Q channel auto-correleation along with I-Q channel cross-correlation. These give the fourier transforms of spectral and cross-spectral densities.

To optimize the system shown in FIG. 2, certain modifications are preferred. To obtain clean separation between the components 37, 39, 41 and 43, a prism polarizer (not shown) may be inserted between each polarizing cube 33 and 35 and its respective photodetector 45, 47, 49 and 51. Alternately, cubes 33 and 35 could be replaced with crystal polarizing prisms. This later modification is believed to be superior.

It could also be advantageous to have some method to insure the relative orientations of the reference beam 7 and the scattered beam 13 with respect to each other and the axes of the beam splitting cube 21. A preferred way to do this would be to place a rotatable half-wave plate or a dove prism between one of the two input beams 7 and 13 and the face of the cube 21 on which it is directed (not shown).

Compensation for different efficiencies in the photodetectors 45, 47, 49 and 51 or for imbalances in the intensity of the two beams 7 and 13 can be achieved by inserting an attenuator in the path of one of the input beams 7 or 13 or between the output of one of the photodetectors 45, 47, 49 and 51 and the subtracter (53 or 55) to which it is connected.

Although the compensators 59 and 61 are not essential for operation, they should be adjusted when present. The combined beam 25 is linearly polarized. The beam splitter cube 27, however, generally causes the output beams 29 and 31 to become elliptically polarized. The compensators 59 and 61 are adjusted so that they return the output polarizations to their linear state. This can be determined by passing the outputs through rotatable linear polarizers. The compensators are then adjusted to maximize the extinction ratios.

The orientation of the polarizing cubes 33 and 35 should also be adjusted. Their S and P axes must lie to either side of the Y axis, as shown by an inset 67. Either the S or P axis should therefore bisect the angle between the reference beam 7 and the scattered beam 13.

The theoretical explanation for applicant's invention is described in "Optical Double-Balance Quadrature Mixer With Applications To Light-Beating Spectroscopy and Photon Counting," an article published in the Review of Scientific Instruments in December of 1987, Volume 58, No. 12 at pp. 2217–2225. Similar background material was presented by applicant in his paper "An Optical Hybrid Mixer and Digital Correlator For High Precision Spectroscopy," published in SPIE, May 19–20, 1987, Volume 789 of Optical Technology For Microwave Applications III at pp. 149–153. The content of these articles is hereby incorporated by reference.

Although the invention has thus far been described with reference only to analysis of scattered light, it is applicable to a broad variety of applications, including, without limitation, laser doppler velocimetry, fiber optic communications, optical phase locked loops and a broad variety of applications involving phase, amplitude or frequency modulation or demodulation. It also is well suited to the measurement of symmetric optical spectra.

Moreover, the invention is by no means limited to the specific components and arrangements of components as described hereinabove. Nor is it limited to the use of linearly polarized light. One could use any orthonormal polarization basis set (e.g. left and right circular polarization) and suitable components produced from optically active materials.

In short, the principles of this invention may be applied generally to a broad variety of embodiments and arrangements. All of such modifications and variations thereof will be readily apparent to those skilled in the art and are all intended to be within the scope of the invention, which is limited solely by the following claims.

What is claimed is:

1. Apparatus for measuring scattered light from a sample comprising:
   a. means for generating a monochromatic beam of light along a first optical path;
   b. first beam splitting means positioned along said first path for splitting said monochromatic beam of light along a second and third optical path;
   c. means carrying a sample interposed in said optical path which produces a scattered beam of light after said second optical path passes therethrough, said beam on said second and third optical paths being, respectively, linearly polarized and perpendicular one to the other;
   d. beam combining means for receiving beams on said second and third optical paths for combining the same on to a single path;
   e. non polarized first beam splitting beams oriented along said single path emanating from said beam combining means for splitting the combined beam emanating from said beam combining means along a fourth and fifth optical path;
   f. second beam splitting means oriented along said fourth optical path for receiving the beam along said fourth optical path and for splitting the beam along a sixth and seventh optical path, said second beam splitting means being polarized;
   g. third beam splitting means oriented along said fifth optical path for receiving the beam along said fifth optical path and for splitting the same along an eighth and ninth optical path, said third beam splitting means being polarized and;
   h. beam retardation means interposed between at least one of said fourth and fifth optical paths for shifting the relative phase between the orthonormal polarization components of the light beam travelling along said optical path substantially ninety degrees as it passes through said beam retardation means.

2. The apparatus defined in claim 1 further including phase compensation means interposed along said fourth and fifth optical paths.

3. The apparatus defined in claim 2 wherein each of said compensators are adjusted to return the beam polarization to its linear state.

4. The apparatus defined in claim 2 wherein each of said compensators are adjusted to maximize extinction ratios.

5. The apparatus defined in claim 1 further including first, second, third and fourth beam intensity measurement means, each having an output, interposed along said sixth, seventh, eighth and ninth paths, respectively, for measuring the intensity of the beams on said paths.

6. The apparatus defined in claim 5 further including:
   first subtractor means for subtracting the output from said first beam intensity measurement means from the output of said second beam intensity measurement means and
   second subtractor means for subtracting the output of said third beam intensity measurement means from said fourth beam intensity measurement means.

7. The apparatus defined in claim 6 further including computation means connected to the outputs of said first and second subtracters for computing bandwidth power.

8. The apparatus defined in claim 7 wherein said computation means computes the square root of the sum of the squares of the outputs of said first and second subtractors.

9. The apparatus defined in claim 6 further including computation means connected to the output of said first and second subtractors for determining the relative phase between said two input beams.

10. The apparatus defined in claim 9 wherein said computation means computes the arc-tangent of the ratio between the output of one of said subtractor means to the output of the other.

* * * * *